No. 805,298. PATENTED NOV. 21, 1905.
R. JOHNSON.
NUT LOCK.
APPLICATION FILED APR. 27, 1905.
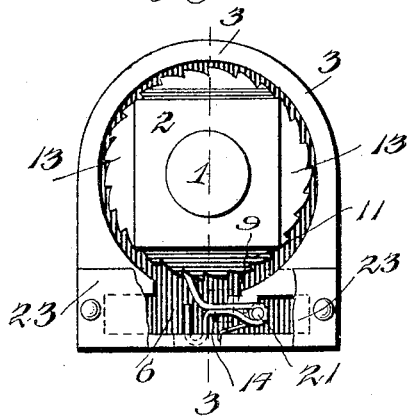
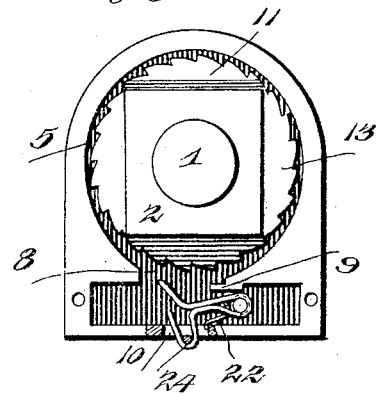
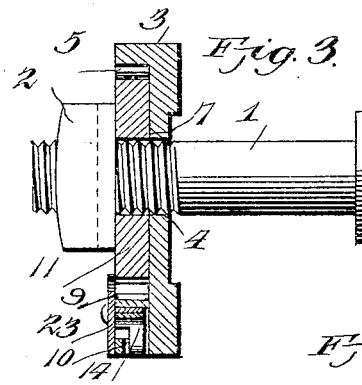
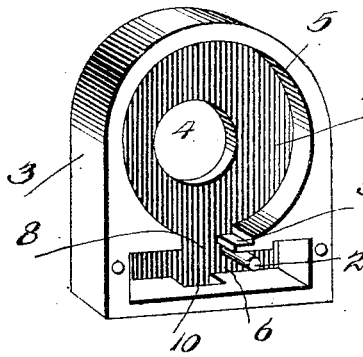
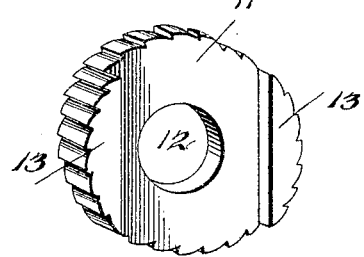
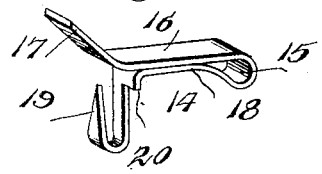
Witnesses
Frank W. Hough
C. C. Hines
Inventor
R. Johnson
By Victor J. Evans
Attorney

UNITED STATES PATENT OFFICE.

RICHARD JOHNSON, OF BESSEMER, ALABAMA.

NUT-LOCK.

No. 805,298.  Specification of Letters Patent.  Patented Nov. 21, 1905.

Application filed April 27, 1905. Serial No. 257,731.

*To all whom it may concern:*

Be it known that I, RICHARD JOHNSON, a citizen of the United States, residing at Bessemer, in the county of Jefferson and State of Alabama, have invented new and useful Improvements in Nut-Locks, of which the following is a specification.

This invention relates to improvements in nut-locks, and has for its object to provide a simple and inexpensive construction of device of this character which will serve the combined function of a washer and lock and effectually prevent the nut having retrograde rotation and from loosening and working off the bolt.

The preferred embodiment of the invention is illustrated in the accompanying drawings, in which—

Figure 1 is a front elevational view of a nut-lock embodying my invention, showing it applied for locking a nut upon a bolt, the cover-plate being broken away to show the pawl in connection with the ratchet-disk. Fig. 2 is a view similar to Fig. 1, the cover-plate being removed and the pawl shown in retracted position. Fig. 3 is a vertical section on a plane indicated substantially by the line 3 3 of Fig. 1. Fig. 4 is a detail perspective view of the washer. Fig. 5 is a detail perspective view of the ratchet-disk, and Fig. 6 is a similar view of the pawl.

Referring now more particularly to the drawings, the numeral 1 represents a bolt of usual construction, and 2 a nut applied to the threaded portion of the shank thereof.

Arranged upon the shank of the bolt in rear of the nut and adapted to bear against the surface of the object to be secured is a washer 3, consisting of a metallic block or plate of suitable size and thickness and formed with an opening 4 to permit it to be loosely fitted on the bolt. This washer is cut away on its front side concentric with the opening 4 to provide a cavity or chamber 5 and is recessed below said cavity or chamber to form an oblong chamber 6, the two chambers being open at the front and closed at the rear by the back or body wall 7 of the washer and being in communication through a passage 8, formed in the intervening lower wall of the cavity 5. One side of the said lower wall of the cavity is provided with a shoulder or projection 9, and the bottom wall of the chamber 6 is provided with a slot 10, leading thereinto, as clearly shown in Figs. 3 and 4.

Arranged within the cavity 7 is a ratchet wheel or disk 11, having an opening 12 to loosely fit upon the shank of the bolt. The rear face of this wheel or disk is flat or plane surfaced to rest against the wall 7 of the washer 3, while the outer or front face thereof is recessed to provide a space for the reception of the base of the nut 2, the side walls of the recess constituting shoulders 13, adapted to bear against opposite sides of the nut to connect it with the ratchet-disk to turn therewith and hold it from independent movement. In practice the bolt is first passed through the openings in the objects to be fastened together, the washer 3 slipped upon the threaded end thereof, the ratchet-wheel 11 applied in like manner, and the nut 2 then screwed thereon until it is adjusted to a sufficient extent to force the wheel against the washer when the base of the nut is seated in the recess in the ratchet-wheel and the two adjusted together until the nut is screwed on to clamp the parts to the desired degree.

In order to lock the ratchet wheel or disk 11, and consequently the nut 2, against retrograde rotation, a pawl 14 of novel construction is provided, the said pawl being formed from a strip of metal folded or doubled upon itself to form a body portion the arms of which are connected at one end by a return portion or loop 15, forming a knuckle, the free end of the upper arm 16 being bent obliquely upward to form a tooth 17 to engage the teeth of the ratchet-wheel, while the free end of the lower arm 18 is reduced in width and bent to form a U-shaped keeper 19, a shoulder 20 being provided by the reduction of the arm at the upper end of the keeper at its point of junction with the arm 18.

The pawl is pivotally mounted in the chamber 6 upon a pivot pin or stud 21, which engages the knuckle 15 and is normally thrown upward to hold its tooth 17 in engagement with the ratchet-wheel by means of a spring 22, said spring being coiled centrally about the stud 21 and having one of its ends projecting into the knuckle in advance of the stud to press the pawl upward and its other end arranged to bear against the bottom wall of the chamber 6. The upward movement of the pawl is limited by the shoulder 9, and the keeper portion 19 of the pawl is disposed above the opening 10. The teeth of the ratchet-wheel 11 are so disposed that when the tooth 17 of the pawl is in engagement therewith said wheel and the nut will be held from retrograde rotation, while the pawl will permit the nut and disk to be turned up on the bolt to adjust the nut to hold the secured object more firmly when occasion requires. The front or open side of the chamber 6 is normally closed by a cover-plate 23, secured by rivets or other suitable fastenings to the washer 3, whereby access to the pawl is prevented, so that unauthorized persons may not gain easy access for the purpose of detaching the nut and bolt.

It is desirable under some conditions to provide means for holding the pawl inoperative in order to permit the nut to be screwed off. In order to enable this to be done, the keeper portion 19 of the pawl is provided. Normally this portion of the pawl projects slightly into the opening 10, but not sufficiently to enable it to be engaged and drawn outward to retract the pawl. When the cover-plate 23 is removed, however, the pawl may be pressed downward against the tension of its projecting spring 22, thus retracting its tooth 17 and projecting the keeper 19 through and below the opening 10, so that a pin or other like detent 24 may be passed between the arms thereof to bridge the opening 10 and hold the pawl retracted, so that the nut may be turned off the bolt.

From the foregoing description, taken in connection with the accompanying drawings, the construction and mode of operation of my invention will be readily understood, and it will be seen that it provides a combined washer and nut-lock which is simple and cheap in construction and efficient in operation, and that when the pawl is in engagement with the ratchet-wheel the nut will be held firmly against retrograde rotation, while the construction is such as to permit the pawl to be conveniently held retracted to permit the nut to be turned off for the removal of the bolt when repairs or substitution of new parts or elements secured by the bolt is required.

Changes in the form, proportions, and minor details of construction may be made within the scope of the invention without departing from the spirit or sacrificing any of the advantages thereof.

Having thus described the invention, what I claim as new is—

A nut-lock comprising a washer having a cavity and a communicating chamber, one wall of the chamber being provided with an opening therein, a cover-plate for the chamber, a pawl mounted within the chamber and comprising a strip of material folded or doubled to form arms connected by a knuckle pivotally connected with the washer, one of said arms terminating in a pawl projecting into the cavity and the other in a U-shaped keeper adapted to project through the opening and to be engaged by a suitable detent to hold the pawl retracted, a spring for projecting the pawl, and a ratchet-wheel disposed in the cavity and engaged by the tooth of the pawl and adapted to engage and hold the nut against retrograde rotation.

In testimony whereof I affix my signature in presence of two witnesses.

RICHARD × JOHNSON.
his
mark

Witnesses:
  J. A. ESTES,
  SAM DOOLEY.